United States Patent

Meyer

[15] 3,676,705

[45] July 11, 1972

[54] LOGIC CIRCUITS EMPLOYING SWITCHES SUCH AS FIELD-EFFECT DEVICES

[72] Inventor: John Evert Meyer, Trenton, N.J.

[73] Assignee: RCA Corporation

[22] Filed: May 11, 1970

[21] Appl. No.: 36,190

[52] U.S. Cl. ............................307/251, 307/304, 307/279

[51] Int. Cl. ..............................................H03k 17/00

[58] Field of Search..................307/205, 241, 251, 269, 279, 307/304; 328/37

[56] References Cited

UNITED STATES PATENTS

| | | | |
|---|---|---|---|
| 3,252,009 | 5/1966 | Weimer | 328/37 |
| 3,395,290 | 7/1968 | Farina et al. | 307/304 |
| 3,439,185 | 4/1969 | Gibson | 307/205 |
| 3,440,444 | 4/1969 | Rapp | 307/251 |
| 3,461,312 | 8/1969 | Faber et al. | 307/251 |
| 3,493,785 | 2/1970 | Rapp | 307/304 |
| 3,497,715 | 2/1970 | Yen | 307/304 |
| 3,506,851 | 4/1970 | Polkinghorn et al | 307/251 |
| 3,526,783 | 9/1970 | Booher | 307/279 |
| 3,524,077 | 8/1970 | Kaufman | 307/246 |

OTHER PUBLICATIONS

Atwood " FET Circuits" IBM Tech. Disclosure Bulletin Vol. 6 No. 9 Feb. 1964 Pages 91–93

Boysel " Muntiphase Clocking" Electronic Design News Pages 50–52, 54–55 6–68

*Primary Examiner*—Donald D. Forrer
*Assistant Examiner*—R. E. Hart
*Attorney*—H. Christoffersen

[57] ABSTRACT

A decoder employing switches such as metal oxide semiconductor (MOS) field-effect devices and diodes in a number of series circuits, each such circuit forming a ring. In the absence of strobe and strobe signals, one diode in one series circuit connects the decoder output terminal to ground. In the presence of strobe and strobe signals, the output terminal is disconnected from ground and, if the control voltages applied to certain of the devices in certain of the series circuits all represent the desired binary value, the strobe signal is conducted via certain of the devices in said one series path to said output terminal.

6 Claims, 5 Drawing Figures

INVENTOR
John E. Meyer
BY
ATTORNEY

INVENTOR
John E. Meyer
BY
ATTORNEY

LOGIC CIRCUITS EMPLOYING SWITCHES SUCH AS FIELD-EFFECT DEVICES

STATEMENT

The invention described herein was made in the performance of work under a NASA contract and is subject to the provisions of Section 305 of the National Aeronautics and Space Act of 1958, Public Law 85-568 (72 Stat. 435; 42 U.S.C. 2457).

SUMMARY OF THE INVENTION

A circuit embodying the invention includes a first circuit comprising *n* switches and a normally conducting asymmetrically conducting element such as a diode connected in a ring. A strobe signal may be applied to one electrode of the element and an output terminal may be located at the other electrode of the element. There are also *n* other series circuits, each connected in a ring, each such circuit including at least two normally open switches and one asymmetrically conducting element, which normally conducts. In response to a level applied to the normally conducting elements in said *n* series circuits, the *n* series connected switches in the first transmission path are maintained open. In response to the concurrent presence of a strobe signal manifestation and the closing of all of the normally open switches in said *n* series circuits, all of the normally conducting elements in all paths are opened, the series connected switches in the first path are closed and a strobe signal is applied through these last-named switches to the output terminal.

DETAILED DESCRIPTION

Figure 1:
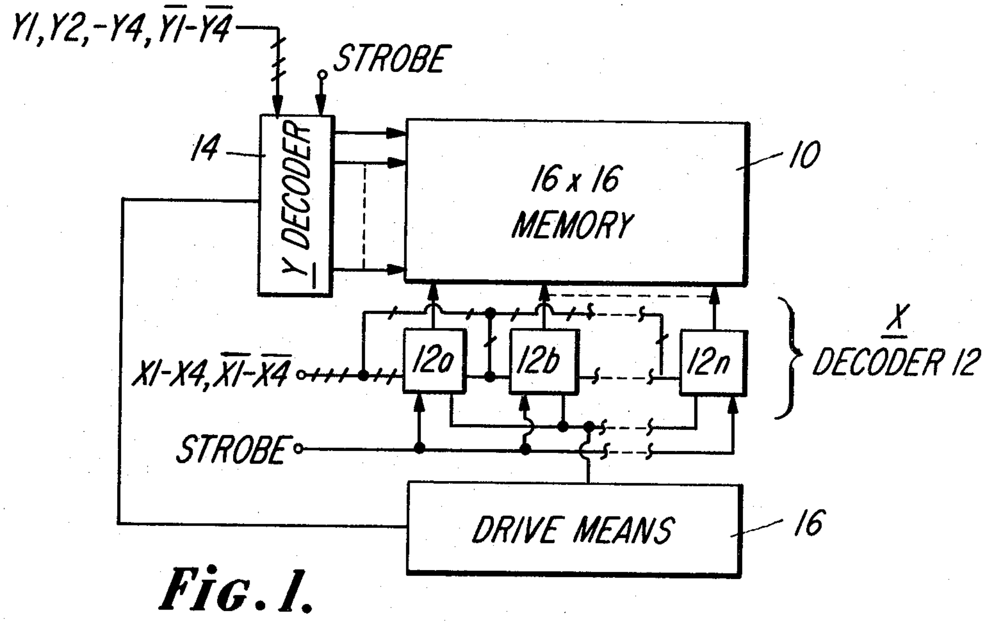
FIG. 1 is a block diagram of a known memory system in which the present invention may be employed.

The known system of FIG. 1 includes a memory 10 which may consist of MOS semiconductor devices. For purposes of illustration, assume that the memory is 16 × 16 that is, there are 16 × 16 memory locations, each such location consisting of one or more semiconductor devices. In a memory of this type, there may be 16 X lines and 16 Y lines. To access the memory location as, for example, to write information into a memory location, it is necessary to apply a drive current to one of the X lines and to one of the Y lines. The means for routing the drive current to the desired memory location includes an X decoder 12 and a Y decoder 14. Each such decoder consists of a plurality of stages, 16 in the present example, and three of them are shown in block form to represent decoder 12.

In the operation of the system of FIG. 1, different combinations of, for example, X control voltages are applied to the various stages of decoder 12 and different combinations of Y control voltages are applied to decoder 14. For example, stage **12*a* may receive the control voltages X1, X2, X3, X4; stage 12*b* may receive the control voltages X1, X2, X3, X4, stage 12*n* may receive the control voltages X1, X2, X3, X4 and so on. When, for example, the four control voltages applied to a stage all represent the binary value 1, the current supplied by the drive means 16** is applied via that stage to the memory drive line connected to that stage.

Figure 2:
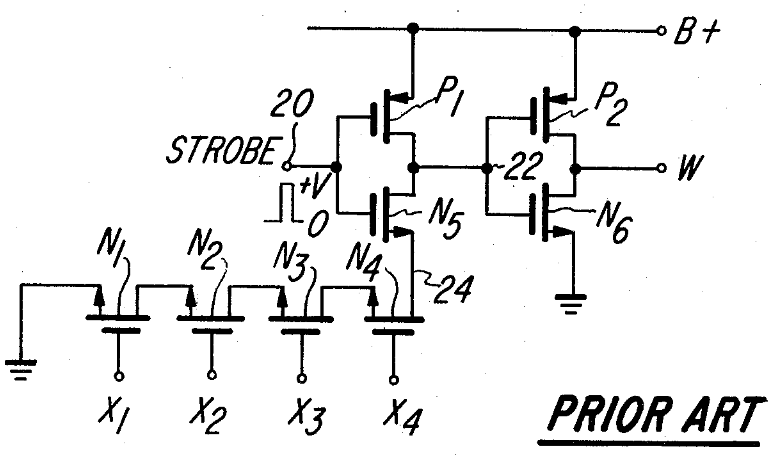
FIG. 2 is a schematic circuit diagram of a known decoder stage.

There are a number of circuits which may be used for the decoder stages. A typical prior art circuit is shown in FIG. 2. It consists of six N-type MOS devices N1, N2 . . . N6 and two P-type devices P1 and P2 connected as shown. In the absence of a strobe voltage applied to terminal 20, that is, when this terminal is at ground potential, the conduction path of device P1 assumes a low value of impedance so that terminal 22 is at approximately the B+ voltage. This voltage applied to the gate electrode of device P2 causes its conduction path to assume a high impedance disconnecting the output terminal W from the B+ voltage terminal. The B+ voltage applied to the gate electrode of the device N6 causes its conduction path to assume a low impedance connecting the output terminal W to ground.

In response to a strobe signal of amplitude +V applied to terminal 20, device P1 is cut off. If during the strobe interval the control signals $X_1$, $X_2$, $X_3$, and $X_4$ are all relatively positive representing a 1, the four devices N1 through N4 are all turned on and their conduction paths all have a low value of impedance. The strobe voltage applied to the gate electrode of the device N5 causes its conduction path also to have a low impedance. Accordingly, terminal 22 assumes a voltage level close to ground causing device P2 to turn on and device N6 to be cut off. In view of the low impedance of the conduction path of device P2, the B+ voltage appears at the output terminal W. If during the strobe interval anyone or more devices N1–N4 remain off, output terminal W is held at or very near zero by N6 which will tend to stay on (and P2 off). This is so since the capacitance between mode 22 and ground remains charged to a value at or very near B+, not being discharged by N1–N5.

While the decoder stage of FIG. 2 is satisfactory in a number of different applications, it does have the disadvantage of relatively low speed. Because the devices N1 through N4 are connected in series, four gate delays are involved before ground voltage appears at common lead 24 and two additional gate delays, namely through devices N5 and P2 occur before the B+ voltage appears at output terminal W. In the case of N MOS devices, these gate delays are not the same device-to-device. As will be shown below, when the devices are connected in a string such as are devices N1 . . . N4, N5 of FIG. 2, each device assumes a threshold voltage $V_T$ which is higher than that of the device lower down on the string. For example, $V_{TN4} > V_{TN3} > V_{TN2} > V_{TN1}$. The greater the threshold voltage, the greater the amount of current overdrive required to achieve a given device speed or, put another way, for a given amount of available drive current, device N4 is slower than device N3; device N3 is slower than device N2; and so on. In other words, if the delay introduced by the first device N1 in a string is $\Delta t_1$, the delay $\Delta t_2$ introduced by the next device N2 is substantially greater than $\Delta t_1$, the delay $\Delta t_3$ introduced by the following device is substantially greater than $\Delta t_2$ and so on.

In more detail, for an N MOS device in saturation, $V_{gs} - V_t \leq V_{ds}$ and $I_{ds} = K_n (V_{gs} - V_t)^2$, where:

$V_{gs}$ = gate-source voltage;

$V_t$ = threshold voltage;

$V_{ds}$ = drain-source voltage;

$I_{ds}$ = drain-source current, and $K_n$ is a gain constant.

For $V_{ds} < V_{gs} - V_t$, $I_{ds} = K_n [2V_{ds} (V_{gs} - V_t) - V_{ds}^2]$.

In either case, the current is inversely related to the threshold $V_t$.

But $V_t = V_{tx} + K \sqrt{V_s - V_{sub} + 2\psi_f}$, where:

$V_{tx}$ accounts for Fermi potential, metal-semiconductor work function difference and insulator charges $k$ = is a constant whose terms are $\sqrt{2qE_sN}$, and $\psi_f$ = Fermi potential of the substrate.

For the normal operation above, $V_{sub} = 0$ and $V_s = 0$, where: $V_{sub}$ = substrate voltage. Therefore $$V_t = V_{to} = V_{tx} + k \sqrt{2\psi_f}$$

However, in a logic gate, part of which is depicted at N1, N2, N3, N4, N5 in FIG. 2, this effect causes the following (assuming that all gates are conducting, that is, that all gates are at $+V > V_t$ and that $V_{sub} = O$):

$$V_{t1} = V_{tx} + k\ \sqrt{2\psi_f} = V_{to}$$

$$V_{t2} = V_{tx} + k\ \sqrt{V_2+2\psi_f} > V_{t1}$$

$$V_{t3} = V_{tx} + k\ \sqrt{V_3+2\psi_f} > V_{t2}$$

$$V_{t4} = V_{tx} + k\ \sqrt{V_4 2\psi_f} > V_{t3}, \text{ etc.}$$

where $V_2$= voltage at the connection between the drain of N1 and the source of N2, $V_3$=voltage at the connection between the drain of N2 and the source of N3, etc.

The threshold voltages are nonlinear functions of the device source potential. Since in the above series string, only the first device's source is constant at zero, all the other devices have an effectively higher threshold during the voltage swing as V5 is discharged to zero. This effect is magnified the more devices that are put in series and the delays introduced by the successive devices are magnified accordingly.

A situation similar to that analyzed above exists when using P MOS devices, however, the delays are not as great as with N MOS devices.

Figure 3:
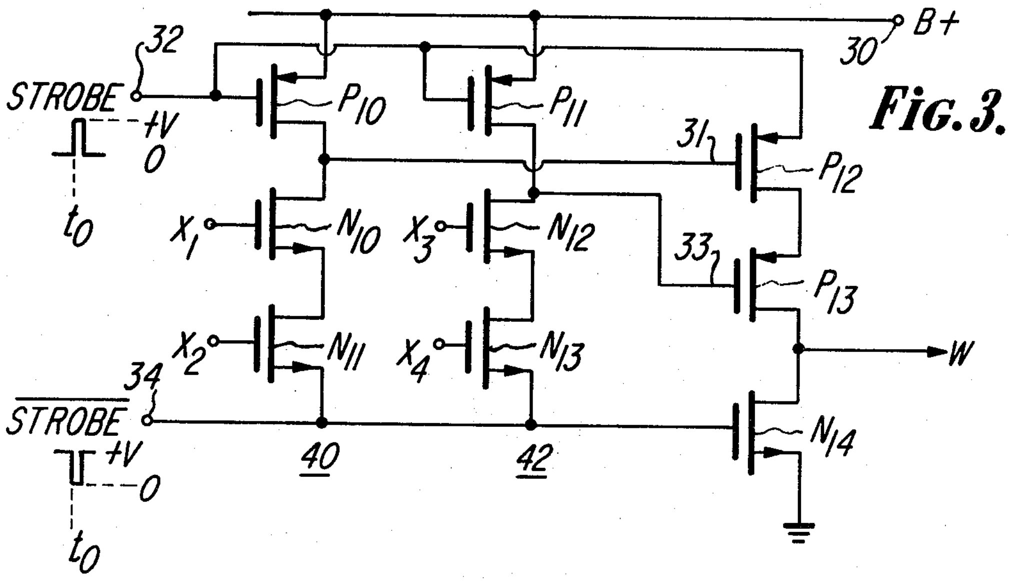
FIG. 3 is a block circuit diagram of a decoder stage which exhibits improved performance over the FIG. 2 circuit.

The speed of each decoder stage may be substantially increased by employing the circuit shown in FIG. 3 which is the subject of copending application Ser. No. 23,294 filed Mar. 27, 1970 by the present inventor. This speed increase is achieved by minimizing the number of devices in a string. For purposes of illustration, the four N type transistor string of FIG. 2 are shown reduced to two strings which include two N-type transistors each. The first string includes a P-type transistor P10 and two N-type transistors N10 and N11, the conduction paths of which are all connected in series. Similarly, the second string includes a P-type transistor P11 and two N-type transistors N12 and N13 all of whose conduction paths are connected in series. The circuit includes also a third group of transistors including P-types P12, P13 and N-type transistor N14, the conduction paths of which are connected in series.

A B+ voltage terminal 30 is connected to the source electrodes of transistors P10 and P11. The source electrode of transistor N14 is connected to ground. A strobe voltage which normally has the value 0 but which, during the strobe interval, has the value +V is applied to the gate electrode of transistors P10 and P11 and the source electrode of transistor P12. A strobe voltage which is complementary to the strobe voltage is applied to the source electrode of transistors N11 and N13 and to the gate electrode of transistor N14.

The common drain electrode connection of transistors P10 and N10 is connected to the gate electrode 31 of transistor P12. The common drain electrode connection of transistors N12 and P11 is connected to the gate electrode 33 of transistor P13. The circuit output terminal is at the common drain electrode connection of transistors P13 and N14.

In the operation of the circuit of FIG. 3, in the absence of strobe and strobe signals, terminal 32 is at ground and terminal 34 is at +V volts. The ground voltage applied to the gate electrodes of the transistors P10 and P11 turns these transistors on and B+ is applied via the conduction paths of these transistors to the gate electrodes 31 and 33 respectively of transistors P12 and P13. This turns these transistors off isolating output terminal W from the strobe input terminal 32.

The +V voltage applied to terminal 34 turns on transistor N14 causing its conduction path to assume a low impedance. This causes the output terminal W to assume a voltage close to ground voltage.

During the strobe interval, terminal 32 is placed at a voltage of +V and terminal 34 is placed at ground potential. The latter disables transistor N14 and this disconnects the output terminal from ground. The +V voltage applied to terminal 32 disables transistors P10 and P11 disconnecting the B+ voltage at terminal 30 from the gate electrodes 31 and 33. If during the stroke interval all of the control voltages X1, X2, X3 and X4 are positive, representing binary 1, the transistors N10, N11, N12 and N13 are turned on. The ground potential at terminal 34 in this case is applied both to gate electrode 31 and to gate electrode 33 turning transistors P12 and P13 on. During this same strobe interval, the voltage +V is present at terminal 32 and it passes through the conduction paths of transistors P12 and P13, which are in their low impedance state, to the output terminal W. If, on the other hand, during the strobe interval any one or more of the voltages X1 through X4 is at ground representing binary 0, the transistor receiving that control voltage is cut off. For example, if X1 represents a 0, transistor N10 is cut off and its conduction path represents a high impedance. In this case, the gate electrode 31 is not connected to ground and the transistor P12 remains in its high impedance condition. This prevents the +V voltage at terminal 32 from being applied to the output terminal W regardless of whether or not transistor P13 is on (is in the low impedance state).

The important advantage of the circuit described above, as already mentioned, is its high speed. In the example given by way of illustration, in the worst case only the delays through two N-type transistors such as N10 and N11 are involved in addition to the time required for the strobe pulse to pass through transistors P12 and P13. If there are say six or eight control voltages rather than the four, techniques similar to this may be employed to minimize delays. For example, in the case of eight control voltages rather than employing two paths such as 40 and 42, four paths could be employed, one additional path for the control voltages X5 and X6 and another for the control voltages X7 and X8. However, for each additional path an additional P-type device is needed in the final path in series with P12 and P13.

It should also be appreciated that there can be more than two N-type devices in the path such as 40. For example, in a circuit with six control voltages X1 . . . X6 there could be three N-type devices in path 40 for the three voltages X1 through X3 respectively and three N-type devices in the path 42 for the three voltages X4 through X6. It should also be appreciated that while in the present example paths 40 and 42 have equal numbers of N-type devices, this is not essential. For example, path 40 could have three such devices in series and path 42, two such devices in series for a decoder responsive to five control voltages.

Finally, it is to be understood that while in the circuit of FIG. 3 each path 40 and 42 has two N-type and one P-type device and the output path has two P-type devices and one N-type device, the N-type devices could be substituted for the P-type and vice versa with suitable modification of the power supply voltage and strobe voltage polarities.

While the circuit of FIG. 3 does have important operating advantages as discussed above, in integrated circuit technology it is desirable to reduce as much as possible the number of connections, lines and line cross-overs. An important improvement in these respects would be achieved in the circuit of FIG. 3 if the connections to ground and to B+ could be eliminated. The circuit of the present invention, an embodiment of which is shown in FIG. 4, meets these requirements and, in addition, retains all of the speed advantages of the FIG. 3 circuit.

Figures 4, 5:
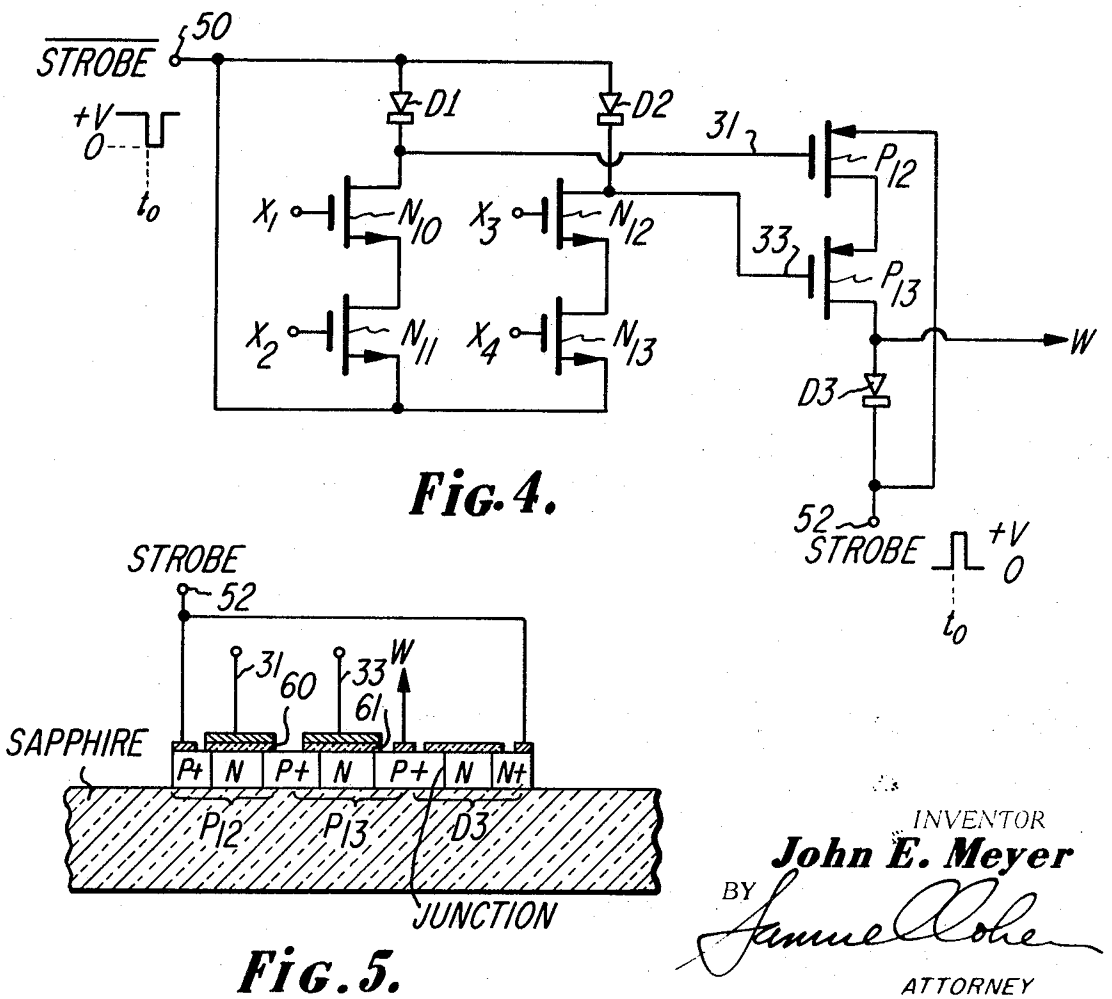
FIG. 4 is a block circuit diagram of an embodiment of a decoder stage according to the invention.
FIG. 5 is a schematic showing of a section through an integrated version of a portion of the circuit of FIG. 4.

The circuit of FIG. 4 contains a number of the same elements, namely the field-effect transistors, as the circuit of FIG. 3 and they are similarly numbered in both figures. The transistors P10, P11 and N14 of the FIG. 3 circuit are eliminated and instead diodes D1, D2, and D3 are inserted in their place, as shown. In addition, rather than a B+ connection, a strobe terminal 50 is connected to the anode of diodes D1 and D2 and also to the source electrode of transistors N11 and N13. In similar fashion, rather than a connection which is permanently connected to ground, the cathode of diode D3 and the source electrode of transistor P12 are connected to a strobe terminal 52.

In the operation of the circuit of FIG. 4, terminal 50 normally is maintained at a direct voltage level +V and terminal 52 normally is maintained at a direct voltage level of zero volts, that is, ground. Assuming for purposes of the present explanation that the distributed capacitance present at the gates 31 and 33 was charged to essentially zero volts (via transistors N10–N13) during the previous strobe interval, and that the distributed capacitance connected between line W and ground was previously charged to some positive voltage level (via diode D3) during the previous strobe interval, the levels +V at 50 and ground at 52 are in the forward direction for the three diodes. Thus, the quiescent voltage level +V at 50 is applied via diodes D1 and D2 to the gate electrodes 31 and 33. This places the conduction paths of transistors P12 and P13 in their high impedance condition, effectively cutting off these transistors. The +V level at 50 is in a direction opposite to that required for conduction through the transistors N10, N11, N12 and N13 so that regardless of the values of X1–X4, these transistors remain cut off. In similar fashion, the zero voltage present at terminal 52 causes whatever positive charge is present at output lead W to discharge through diode D3 to ground and the output line W is clamped to ground.

In response to the strobe and strobe signals (zero at 50 and +V at 52), the diodes D1, D2 and D3 are cut off. The zero voltage level of the strobe pulse, however, is in a sense to permit conduction through the N type transistors. Therefore, if all four signals X1–X4 represent a 1 (all relatively positive) during the strobe interval, the transistors N10 and N11 conduct the 0 voltage level to the gate electrode 31 and the transistors N12 and N13 conduct the zero voltage level to the gate electrode 33. These voltages are in a sense to cause the conduction paths of transistors P12 and P13 to assume their low impedance condition. Therefore, the +V strobe pulse applied to terminal 52 passes through the conduction path of transistors P12 and P13 to the output line W.

In the operation of the circuit of FIG. 4, if during the strobe interval any one of the signals X1 through X4 represents binary 0, the output produced at W remains at zero. For example, if $X_4$ represents binary 0, transistor N13 does not conduct. Therefore, the positive voltage +V present at the distributed capacitance at the gate electrode 33 cannot discharge through the path N12, N13 (nor can it discharge through diode D2 which is cut off and is connected at its cathode to gate electrode 33) so that transistor P13 remains cut off. Therefore, even though there is a positive strobe pulse present at 52, it cannot pass through the conduction path of transistor P13 and output line W remains at the previous value to which it was charged, namely at ground.

As already mentioned, an important advantage of the circuit of FIG. 4 aside from its high speed performance is its simplicity which makes the circuit layout, for purposes of integration, considerably simpler than it is for the FIG. 3 circuit. The circuit of FIG. 4 is particularly useful in the silicon on sapphire technology since special precautions are not needed to isolate the diodes from the MOS transistors, as all unnecessary silicon is etched away. In this technology, the diodes are fabricated in a vertical junction geometry as shown in FIG. 5.

FIG. 5 shows, by way of example, the portion P12, P13, D3 of the circuit. The diode is shown at D3 and the vertical rectifying junction is that between the N and P+ regions, as shown. The gate electrodes 31 and 33 are spaced from the channel regions by insulating layers shown at 60 and 61. The fabrication of the circuit is accomplished by standard techniques well known to those skilled in the art. The structure of the N-type transistors (not shown) is similar to that shown except that the source and drain regions are of N+ material and the channel of P material.

While the embodiment of the invention shown in FIG. 4 has been illustrated in terms of an address decoder, it should be apparent that the subcombinations of the circuit have independent utility as logic circuits such as NAND and NOR circuits. As examples, the circuit D1, N10, N11 has independent utility as does the circuit P12, P13, and D3. It is also to be understood that various modifications of the FIG. 4 circuit similar to those described for the FIG. 3 circuit are possible and are within the scope of the present invention.

In the claims which follow, various elements are stated to be connected "in a ring." This expression is intended to mean that there is a series path through the elements and the two ends of the path join in a common circuit point — the two ends are at the same potential. For example, as applied to the elements D1, N10, N11 of the FIG. 4 circuit, the conduction paths through D, N10 and N11 are connected in series and the source electrode of transistor N11 is connected directly to (is at the same potential as) the anode of the diode D1, this common connection comprising the STROBE terminal 50. This contrasts with the previous circuit of FIG. 3 where, while the conduction paths of transistors P10, N10 and N11 are in series, the paths are not connected in a ring. Instead, the source electrode of transistor P10 is connected to a terminal at a constant voltage level B+ and the source electrode of transistor N11 is connected to a different terminal 34 to which a STROBE voltage which varies between +V and ground is applied.

What is claimed is:

1. In combination:

a first circuit comprising *n* switches and a two electrode, asymmetrically conducting element, all connected in series, in a ring, where *n* is an integer greater than 1;

an output terminal at one electrode of said element;

means for normally applying to the other electrode of said element a bias in the forward direction for maintaining said output terminal at a reference level;

*n* other circuits, each comprising a plurality of serially connected, normally open switches in series with one asymmetrically conducting element, in a ring;

means for normally maintaining open the series connected switches in said first circuit via the asymmetrically conducting elements in said *n* circuits, respectively, comprising means for applying to one electrode of the element in each such circuit a forward voltage for transmission through that element to a switch in the first circuit; and means responsive to the concurrent application to said asymmetrically conducting elements of strobe signals of a polarity to reverse bias all such elements and to the closing of all of the normally open switches in said *n* circuits for closing the switches in said first circuit and applying a strobe signal through said closed switches of said first circuit to said output terminal.

2. In the combination as set forth in claim 1, said asymmetrically conducting elements comprising diodes.

3. In the combination as set forth in claim 2, said switches comprising field-effect transistors.

4. In the combination as set forth in claim 3, the switches in said first circuit comprising field-effect transistors of one conductivity type and the switches in the remaining paths comprising field-effect transistors of another conductivity type.

5. In the combination as set forth in claim 2, said switches in said first circuit comprising field-effect transistors, each having a conduction path and a control electrode, said conduction paths being connected in series; and said means for maintaining open the switches in said first circuit comprising means for applying a voltage level through the respective diodes in said *n* other circuits to the respective control electrodes of the field-effect transistors in said first circuit for maintaining said conduction paths in a high impedance state.

6. In the combination as set forth in claim 5, the switches in said *n* other circuits comprising field-effect transistors of opposite conductivity to those in the first circuit, each such transistor having a conduction path and a control electrode and the conduction paths in each such circuit being connected in series; and said means for closing the switches of said first circuit comprising means for applying a strobe signal through the conduction paths of the transistors in said *n* other circuits, respectively, to the respective control electrodes of the transistors in said first circuit.

* * * * *